No. 655,681. Patented Aug. 14, 1900.
J. A. BEAMER.
TURN TABLE.
(Application filed Aug. 8, 1899.)

(No Model.) 2 Sheets—Sheet 1.

Witnesses:

Inventor:

No. 655,681. Patented Aug. 14, 1900.
J. A. BEAMER.
TURN TABLE.
(Application filed Aug. 8, 1899.)
(No Model.) 2 Sheets—Sheet 2.
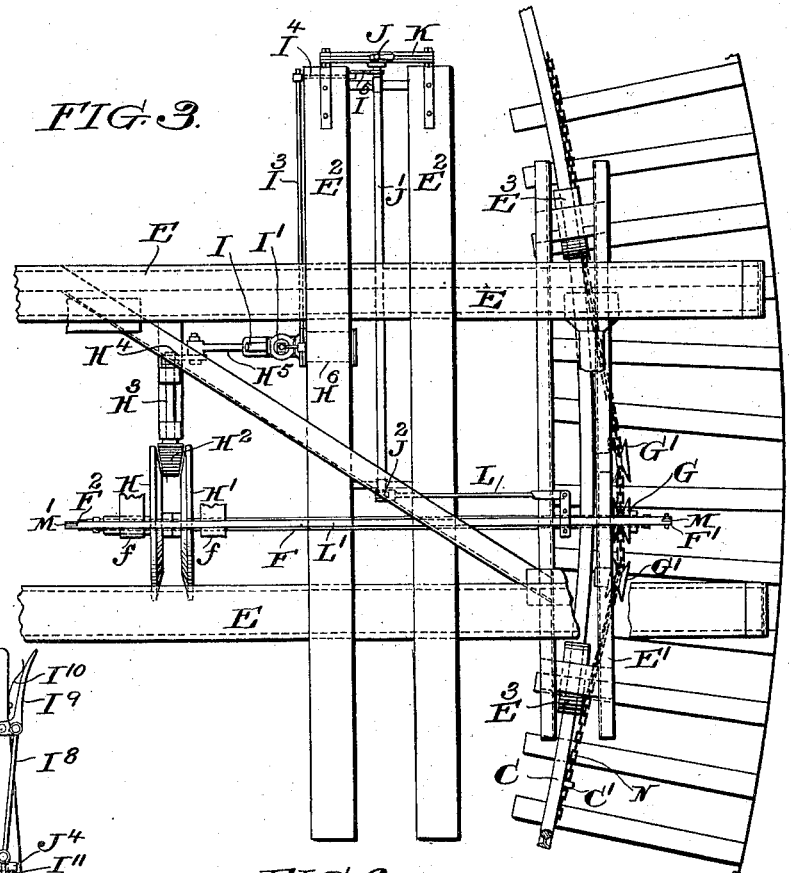
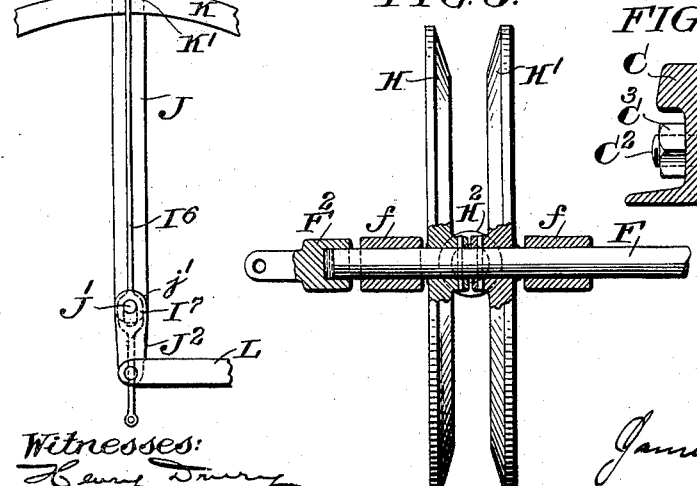
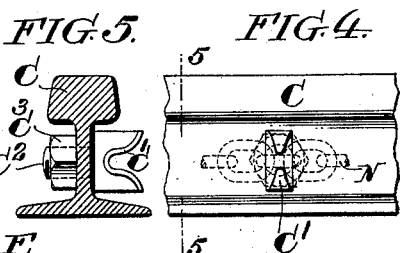
Witnesses:
Inventor:
James A. Beamer
by his atty.

UNITED STATES PATENT OFFICE.

JAMES A. BEAMER, OF TYRONE, PENNSYLVANIA.

TURN-TABLE.

SPECIFICATION forming part of Letters Patent No. 655,681, dated August 14, 1900.

Application filed August 8, 1899. Serial No. 726,509. (No model.)

*To all whom it may concern:*

Be it known that I, JAMES A. BEAMER, a citizen of the United States of America, residing in Tyrone, in the county of Blair, in the State of Pennsylvania, have invented a certain new and useful Improvement in Turn-Tables, of which the following is a true and exact description, reference being had to the accompanying drawings, which form a part thereof.

My invention relates to turn-tables such as are used in connection with railroads, and has for its object to provide a simple but thoroughly-efficient and well-adapted mechanism for actuating such turn-tables.

The nature of my improvement will be best understood as described in connection with the drawings in which it is illustrated, and in which—

Figure 1:
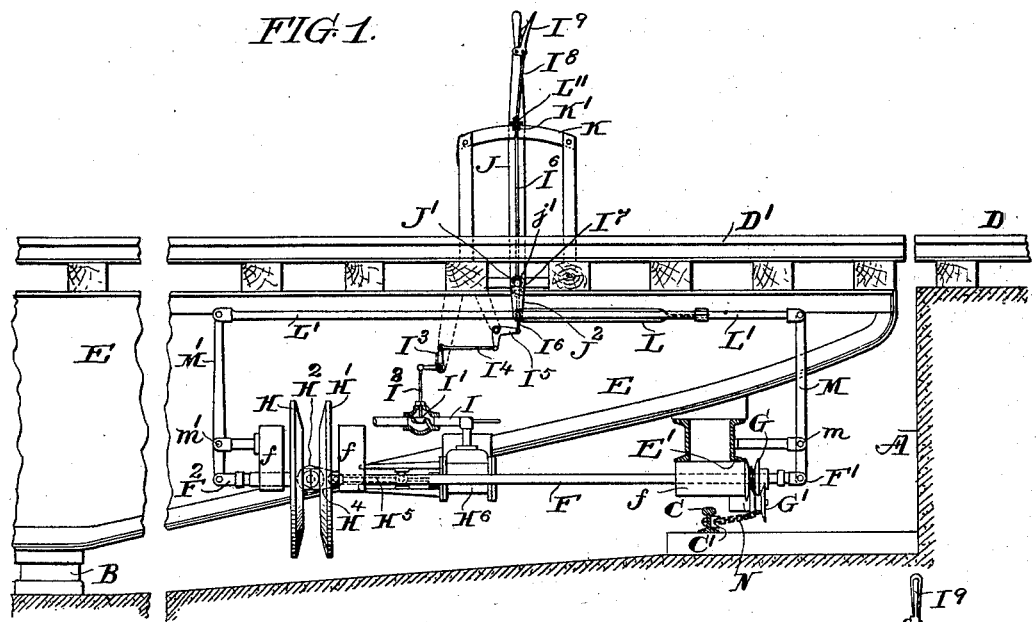
Figure 2:
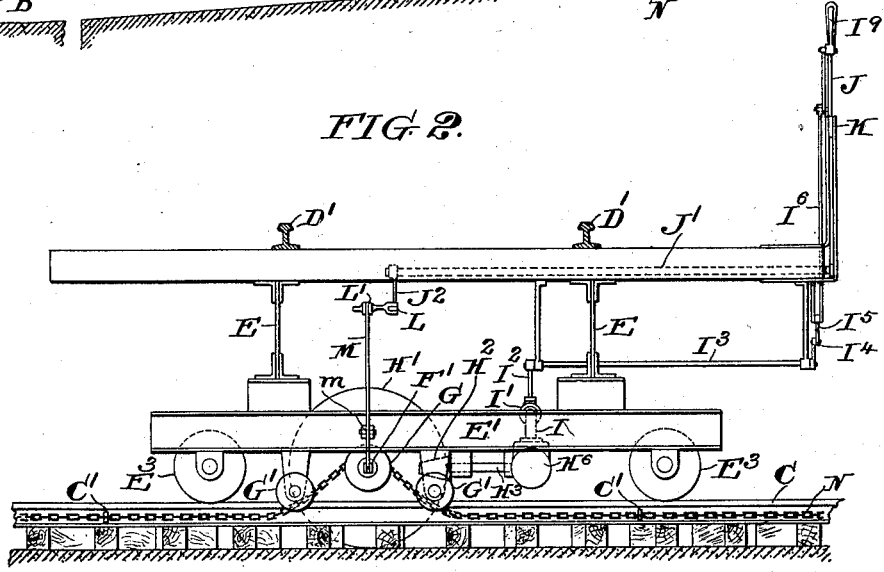

Figure 1 is a side elevation of a turn-table provided with my improvement in what I believe to be the best and most efficient form. Fig. 2 is an end view of the turn-table. Fig. 3 is a plan view. Fig. 4 is a view of a portion of the circular track extending around and partly supporting the turn-table, showing one of the anchoring devices for the chain. Fig. 5 is a cross-sectional view taken on the line 5 5 of Fig. 4. Fig. 6 is an enlarged view showing a portion of the driving-shaft and the friction-clutch or friction-gear mechanism connected therewith, and Fig. 7 is an enlarged view showing an actuating-lever and its connections.

A indicates the body of the turn-table, and B its central foundation, E indicating the turn-table itself.

E' indicates a cross-beam fastened near the end of the turn-table and to which in turn are secured the bearing-wheels running on the circumferential track and certain other mechanism.

$E^2$ $E^2$ indicate cross ties or beams supported on the turn-table and supporting certain parts of my mechanism.

$E^3$ $E^3$ are bearing-wheels of the turn-table, resting on the track C.

F is a shaft supported on bearings $ff$, &c., on the turn-table and in the particular form shown free to move longitudinally for a short distance in said bearings.

F' and $F^2$ indicate the ends of this shaft to which connections are made, as hereinafter described.

G is a sprocket-wheel secured on the shaft F so as to lie a short distance outside of the line of the circumferential track C.

G' G' are guide-wheels secured to the cross-beam E' so as to lie on each side of and below the sprocket-wheel G.

H H' are friction-clutches or friction-gear members consisting, as shown, of bevel friction-wheels, their beveled faces lying opposite to each other and both secured to rotate with the shaft F. As illustrated in the drawings, they are also immovably connected with the shaft F and are moved longitudinally by it.

$H^2$ is another friction clutch or gear member, shown as in the form of a bevel-wheel lying between the bevel-wheels H and H'. In the construction illustrated it is secured to a shaft $H^3$, running in bearings secured to the frame of the turn-table and having secured to it a crank-arm $H^4$, which in turn is engaged and actuated through a connecting-rod $H^5$ by a motor, (indicated at $H^6$.) It is obvious that relative movement of the members $H^2$ or H H' of the clutch or gearing will bring the member $H^2$ into contact with either the wheel H or the wheel H' and through said members rotate the shaft F in either direction. In the intermediate position of the members the friction-wheel $H^2$ engages neither of the wheels H or H' and no motion is imparted to the shaft. In the construction shown I secure the necessary relative shifting of the clutch members by longitudinally moving the shaft F; but the said necessary relative movement may be secured by any mechanical equivalent device.

I indicates a conduit for motive fluid, such as steam, leading to the motor $H^6$; I', a cut-off device shown as a valve for opening or closing this conduit. $I^2$ indicates the valve-stem which connects with one lever of a rock-shaft bell-crank device, (indicated at $I^3$,) the other lever connecting to a rod $I^4$ with a bell-crank $I^5$, which in turn is connected by a rod $I^6$ with a latch-bolt $I^{11}$, (best shown in Fig. 7,) which again is connected by a rod $I^8$ with a grip-lever $I^9$, pivoted at $J^3$ to the lever J and normally pressed out by a spring $I^{10}$. The rod I⁶ lies along the lever J, being held in position by a cleat J⁴ and by a slotted enlargement I⁷, passing over a pin j', extending out from the center of the rock-shaft J'. The lever J above mentioned is secured at bottom to the shaft J', to which is also secured the short lever-arm J², to the end of which is connected the rod L, secured at its other end to the connecting-rod L', the ends of which rod are connected, respectively, with levers M and M', pivoted at m and m', and connected, respectively, with the ends F' and F² of the shaft F.

N is a chain surrounding the turn-table on the outside of the track C and engaged at convenient intervals by the anchoring devices C', which, as shown, (see Figs. 4 and 5,) are secured on the outside of the web of the rails by bolt extensions C², passing through the webs and nuts C³, screwing thereon.

The chain N passes under the guide-wheels G' G' and over the sprocket-wheel G. Therefore it is obvious that as the shaft F and sprocket-wheel revolve the table will be caused to rotate on its center in accordance with the direction in which the shaft is rotated. The longitudinal slipping of the chain is not apt to occur on account of the large frictional contact it has with the rail C, but can be effectually prevented by the use of the anchoring devices C', which engage its links and prevent its moving longitudinally, while the shaft of the anchoring devices is such as not to offer any sensible obstruction to the lifting of the chain over the sprocket-wheel. By shifting the lever J the shaft F is caused to move in or out, as may be desired, pressing either the bevel-wheel H' or the bevel-wheel H into contact with the stationary bevel-wheel H², which if the motor is in operation is in constant motion in a single direction, but in accordance with its contact with the wheels H' or H drives the shaft F either forward or backward, as desired.

It is of course undesirable that the motor and bevel-wheel H² should be kept in constant operation, and at the same time it is highly desirable that the motor and wheel H² should be in full operation before the work of moving the table is thrown upon them. This is provided for in the construction illustrated by providing as a starting and stopping device for the motor a valve I', connected with the latch-bolt I¹¹ of the clutch-actuating lever J, this bolt in normal non-operative position engaging a detent K' in a segment K, which corresponds to the intermediate position of the clutch-actuating lever—that is to say, the position in which the bevel H² engages neither of the wheels H H'. When it is desired to operate the turn-table, the operator first withdraws the latch-bolt I¹¹ by gripping the clutch-lever I⁹, and in doing so he starts the motor by the connections with the clutch-lever and locking-bolt which have been described. The operator then moves the lever J in the direction to engage the clutch so as to move the table in the direction desired, and after he has shifted the lever from the intermediate position the bolt I¹¹ rides on top of the segment K, retaining the motor in operation even if the operator relaxes his grip on the clutch-lever I⁹ and until he has shifted the clutch-lever back to the intermediate position.

Among the desirable features I have had in view in designing my above-described mechanism are the following: The small number and extreme simplicity of the parts involved in the construction; the ready adaptation of the device to any convenient driving power; the speeding of the motor before work is thrown upon it, so that a motor of low power can be relied upon to effect considerable work; the frictional transmission of the power which, by its freedom to slip, avoids destructive racking; the quick braking effect attainable by reversing the gear, and, finally, the ease with which the table can be turned by any driving mechanism offering the minimum of resistance.

Having now described my invention, what I claim as new, and desire to secure by Letters Patent, is—

1. In combination with a turn-table, a motor, a device for admitting to or cutting off motor fluid from the motor, a clutch member driven by the motor, a second clutch member arranged to be actuated by the first and connected to actuate the table, a lever for engaging and disengaging the clutch members, and means connected with said lever for actuating the device regulating the admission of motor fluid to the motor.

2. In combination with a turn-table, a motor, a device for admitting to or cutting off motor fluid from the motor, a clutch member driven by the motor, a second clutch member arranged to be actuated by the first, and connected to actuate the table, a lever for engaging and disengaging the clutch members, a segment, as K, having a locking-detent, as K', corresponding to a position of the lever when the clutch is disengaged, a bolt, as L¹¹, arranged on the lever to engage said detent and when the lever is shifted to ride on the segment K and mechanism connecting the bolt and the device controlling the admission to the motor as described and whereby the motor fluid is admitted when the bolt is withdrawn and cut off when it again falls into the detent.

3. In combination with a turn-table, a motor, a clutch member, as friction-wheel H², actuated thereby, a shaft, as F, longitudinally movable, clutch members as friction-wheels H H' secured to said shaft so as to move with, but not on the same, said wheels being arranged to engage the member H² as they are shifted with the shaft and be driven by it in opposite directions means for shifting said shaft and clutch members, and means actuated by said shaft for turning the table.

4. In combination with a turn-table, a motor, a clutch member, as friction-wheel $H^2$, actuated thereby, a shaft, as F, longitudinally movable, clutch members as friction-wheels H H' secured to said shaft and arranged to engage the member $H^2$ as they are shifted and be driven by it in opposite directions, a lever, as J, for shifting the clutch, a segment K having a detent K', a latch-bolt secured to and movable on the lever J said bolt being adapted to engage in detent K' when the lever is in its intermediate position and to be supported on segment K in all other positions of said lever, and means for starting and stopping the motor actuated by the movement of the latch-bolt, means for shifting said clutch members, and means actuated by said shaft for turning the table.

5. In combination with a turn-table, a chain extending around the base thereof, a shaft supported on the turn-table, a sprocket-wheel supported on the shaft and engaged by the chain, a motor, a friction-clutch member actuated by the motor, a double friction-clutch member secured to the shaft and arranged to engage the member driven by the motor to drive the shaft in either direction and means for engaging and disengaging the clutch members.

6. In combination with a turn-table and a track, as C, extending around its base, two or more anchor devices, as C', arranged to engage and hold a chain against longitudinal movement while permitting it to be raised freely said anchors being situated on the outer side of the track, a chain situated around the track in engagement with the anchors, a shaft on the table, a vertical sprocket-wheel on the shaft over which the chain passes, and two vertical guide-wheels G' G' arranged below and on each side of the sprocket-wheel under which the chain passes.

JAMES A. BEAMER.

Witnesses:
H. C. BEVIS,
E. J. IMHOF.